Patented Jan. 9, 1951

2,537,019

UNITED STATES PATENT OFFICE 2,537,019

COATING COMPOSITIONS

Gerald R. Barrett, Winchester, Mass., assignor to Monsanto Chemical Company, St. Louis, Mo., a corporation of Delaware No Drawing. Application May 29, 1948, Serial No. 30,217

12 Claims. (Cl. 260—45.2)

The present invention relates to a new class of protective coating compositions for surface finishing rigid or non-flexible base materials such as metals, moulded plastics, wood and the like, and flexible base materials such as fabrics, paper and the like. It more particularly relates to inexpensive and improved coating compositions from which a hard, yet flexible, solvent-resistance film can be formed and to base materials coated with such a film.

One object of the present invention is to provide a new class of inexpensive coating compositions which are especially adapted for surface finishing non-flexible and flexible base materials.

A further object of the invention is to provide a new class of inexpensive coating compositions which form coatings or films characterized by good strength, toughness, flexibility and excellent resistance to solvents.

A further object of the invention is to provide flexible and non-flexible base materials which are coated with a film or coating formed from the foregoing coating compositions, said film or coating being characterized by good adhesion to said base materials.

Still further objects and advantages of the invention will appear from the following description and the appended claims.

The present invention provides coating compositions comprising as their essential film-forming materials (1) a copolymer of a secondary alkyl half ester of an ethylene α,β-dicarboxylic acid, such as maleic acid, in which the alkyl group contains from 4 to 12 carbon atoms, with a polymerizable vinyl compound having the structural formula: R—CH=CH₂, where R is a phenyl or substituted phenyl radical, and (2) an aminoaldehyde thermosetting resin such as a urea-formaldehyde resin, a melamine-formaldehyde resin and the like; and an organic solvent or vehicle for the foregoing ingredients. Such copolymer constitutes a major proportion of said essential film-forming materials and such thermosetting resin constitutes a minor proportion of said essential film-forming materials. In addition, and depending upon the base material to which such coating composition is applied, such coating compositions may also comprise small or relatively minor amounts of thermoplastic film-forming materials such as alcohol-soluble or partially alcohol-soluble natural resins, nitrocellulose, ethyl cellulose and the like; and polymethyl methacrylates, polymethyl acrylates and other polymerized acrylates and methacrylates. Such coating compositions may also comprise compatible plasticizers as described hereinafter, adjuvants such as pigments, dyes, lakes, flattening agents, extenders and the like, depending upon the properties desired in the coatings or films and the base materials on which such coating compositions are applied.

The coatings which are formed from the above compositions are normally dried at room temperatures or at slightly higher temperatures as, for example, temperatures of 100 to 150° F. to drive off the solvent contained therein, and yield hard, yet flexible, films which undergo a marked change in resistance to solvents on aging or heating. This change in properties, which is evidenced by the increased solvent-resistance of the film, is accelerated to a considerable extent by heating the film at elevated temperatures as, for example, 200 to 350° F. for a short period of time such as 2 to 12 minutes, depending on the temperature employed. In addition to increased resistance to solvents other beneficial improvements in the film properties are affected by aging or heating such film. Thus, it has been found that the aged or heated film possesses increased tensile strength, resistance to chemical attack, resistance to water, and in some instances, when certain proportions of thermosetting resin are employed, an increased elongation under load. These improvements in the properties of the film on aging or heating are believed to be the result of a mutual reaction between the copolymer and thermosetting resin or a cross-linking of the copolymer by the thermosetting resin, which, in either case is hereinafter referred to as a curing of the film or coating. In any event, the film properties of the copolymer are markedly altered and improved in the manner indicated.

The above described copolymers may be prepared in various ways, but, in general, they are prepared by first reacting a secondary monohydric alcohol having from about 4 to 12 carbon atoms with an ethylene α,β-dicarboxylic acid or anhydride in a molal ratio varying between about 1:1.0 to 1:1.5. The resulting half ester is then copolymerized with a polymerizable vinyl compound of the type described above, generally, in a molal ratio of about 1:1.0 to 1:2.0, and preferably in a molal ratio of about 1:1.1 to 1:1.5.

As examples of secondary alkyl half esters which are prepared and then copolymerized in the foregoing manner may be mentioned secondary butyl acid maleate, methyl isobutyl carbinyl acid maleate, methyl amyl carbinyl acid maleate, methyl hexyl carbinyl acid maleate, methyl heptyl carbinyl acid maleate, methyl decyl carbinyl acid maleate and the like, and the corresponding acid fumarates. Secondary alkyl acid maleate, in which the alkyl group contains from 6 to 10 carbon atoms are preferred.

As examples of the above described polymerizable vinyl compounds which are copolymerized with such secondary alkyl half esters may be mentioned styrene, methyl styrene, dimethyl styrene, halogen substituted styrene, such as nuclear substituted chlor-styrene, dichlor-styrene and the like. Of these, styrene is preferred.

The copolymerizable monomers, as, for example, styrene and the secondary alkyl acid maleates may be copolymerized by any of the well-known methods such as the mass polymerization, emulsion polymerization or other methods depending upon the mutual solubility or mutual insolubility of the monomers. If the monomers are mutually soluble they may be mass polymerized by heating them at temperatures varying between about 100 to 300° F. for about 2 hours in the absence of a solvent, but in the presence of a peroxide catalyst as, for example, benzoyl peroxide. On the other hand, if the monomers are not mutually soluble they may be copolymerized in some instances by emulsion polymerization or by employing a solvent, which is capable of dissolving the monomers and the copolymer. In the latter method, the copolymerization is usually carried out at the boiling point of the solvent which is refluxed back to the reaction mixture. The copolymer is precipitated after it is formed by the addition of a diluent and is removed by filtration, centrifuging and the like.

The thermosetting resins, which are employed along with the above copolymers in the coating compositions of the present invention, are, in general, essentially monomeric or low polymeric amino-aldehyde resins such as urea-formaldehyde resins, e. g., mono-methylol urea, dimethylol urea; alkylated urea-formaldehyde resins, e. g., methoxy methyl urea, dimethoxy dimethyl urea; melamine-formaldehyde resins, e. g., the various methylol melamines, wherein the melamine contains from 1 to 4 methylol groups; alkylated melamine-formaldehyde resins, e. g., alkoxy alkyl methylol melamines, such as di-(methoxy methyl) methylol melamine, tri-(methoxy methyl) metholyl melamine, di-(methoxy methyl) dimethylol melamine and the like. The alkylated melamine-formaldehyde resins and particularly methylated melamine-formaldehyde resins of the foregoing type are preferred. Such resins may be prepared by the well-known methods of the prior art.

The coating compositions of the present invention comprise, in general, from about 5 to 28% by weight of a copolymer of the type hereinbefore described, from about 0.2 to 4.0% by weight of a thermosetting resin, e. g., an amino-aldehyde resin, from about 0–15% by weight of a compatible plasticizer for the copolymer and the resin, as, for example, butyl ricinoleate, di-(butoxy ethyl) phthalate and the like, from zero to about 5% by weight of a pigment or flattening agent such as carbon black or silica aerogel and from zero to about 10% by weight of a thermoplastic film-forming material of the type hereinbefore described, the remainder being a solvent such as alcohol-ethyl acetate mixtures, diacetone alcohol and the like, the particular composition which is employed being dependent upon the particular flexible or rigid base surface to which it is applied.

A further understanding of the advantages and uses of the coating compositions of the present invention will be obtained from the following examples which are intended to be illustrative, but not limitative of the scope of the invention, parts and percentages being by weight unless otherwise specified.

EXAMPLE I

A copoylmer (hereinafter referred to as copolymer Y) was prepared as follows:

One molecular proportion of secondary octyl alcohol (octanol-2) was reacted with about 1 molecular proportion of maleic anhydride at a temperature of about 70° C. until the reaction product had a substantially constant acid value (as determined by titrating an aliquot portion) on continued heating. The resulting mass was then copolymerized with about 1.4 molecular proportions of styrene in the presence of about 0.003 molecular proportions of benzoyl peroxide. The temperature of the mass was maintained at about 80° C. during the period of rapid heat evolution and was then raised to about 120° C. for a period of 1½ hours. On cooling, a hard, glassy resin was obtained.

A coating composition containing the above copolymer was prepared containing the following ingredients in the proportions stated:

| | Parts |
|---|---|
| Special denatured alcohol No. 1 | 19.8 |
| Ethyl acetate | 13.2 |
| Butanol | 12.7 |
| Mixture of ortho- and para-toluene ethyl sulfonamide (plasticizer) | 9.0 |
| Copolymer "Y" (as prepared above) | 6.8 |
| Di-(methoxy methyl) monomethylol melamine (50% by weight resin in equal mixture of xylol and butanol) | 4.3 |
| Ethyl phosphoric acid (curing catalyst) | 0.2 |
| ½ sec-nitrocellulose (dry) | 9.0 |
| Inert grind (3 parts of silica aerogel, 1 part of ½ sec-nitrocellulose ground in a ball mill with a mixture of equal parts of ethyl acetate, ethanol and toluol) | 25 |

This coating composition was appled by roll coating to a tracing cloth, which had been previously coated with starch, as a substitute for nitrocellulose, and other lacquers. After drying at about 110° F. to drive off the volatile solvents, the coated tracing cloth was heated at about 200° F. for 10 minutes to cure the coating, that is render it resistant to chemicals, solvents and the like. The coated tracing cloth so obtained possessed good ink receptivity and was flexible without cracking. Moreover, the coating was substantially non-yellowing even after prolonged storage. In addition, the coating provided an excellent base for the application of photographic emulsions of the type commonly employed on lacquered tracing cloth.

In place of the solvents used in the above composition, other low-boiling solvents may be employed. As examples of these, may be mentioned methanol, isopropanol, n-propanol and the like in place of denatured alcohol; denatured alcohol, isopropanol, n-propanol and the like in place of butanol; and butyl acetate, propyl acetate and the like in place of ethyl acetate. Still other solvents or solvent mixtures will be apparent to those skilled in the art.

Materials other than silica aerogel may be employed in the inert grind which is incorporated in the above coating compositions. For example, the silica aerogel may be replaced with bentonite aerogel, metallic oxide aerogels, diatomaceous earth and the like or with other materials having similar characteristics. These materials are employed primarily to give a "bite" to the coating surface and thus facilitate the flow of ink from an inking pen onto the coating.

The quantity of plasticizer employed in the above coating composition may be varied, for example, from about 10 to 15% on either side of the quantity described in the above composition, while the nitrocellulose may be varied about 10% on either side of the quantity described.

EXAMPLE II

A copolymer (hereinafter referred to as copolymer Z) was prepared as follows:

One molecular proportion of methyl isobutyl carbinol was reacted with about 1.1 molecular proportions of maleic anhydride at a temperature of about 80° C. until the product had a substantially constant acid value on continued heating. The resulting mass was then copolymerized with about 1.5 molecular proportions of styrene in the presence of about 0.003 molecular proportion of benzoyl peroxide and about 0.002% by weight based on the foregoing ingredients of $\beta$-nitro styrene. The temperature of the copolymerization mass was maintained at 75° C. during the period of rapid heat evolution and was then raised to 125° C. for a period of 1½ hours to complete the reaction. The viscosity of 0.2 gram of the dry copolymer in 10 c. c. of cyclohexanone was 0.42 cps. at 25° C. as measured with a #50 Ostwald-Cannon-Fenske pipette.

In place of $\beta$-nitro styrene, other chain-breaking copolymerization retarders may be used to cause the formation of copolymer chains of relatively low molecular weight. Such copolymers are referred to herein as low viscosity copolymers. Other methods of producing low viscosity copolymers may also be used as, for example, by employing larger quantities of catalyst during the preparation of the copolymer. The advantage of using a low voscosity copolymer is that a sprayable coating composition containing up to 28% copolymer by weight can be prepared.

A coating composition including the above copolymer was prepared containing the following ingredients in the proportions stated:

| | Parts |
|---|---|
| Copolymer Z (as prepared above) | 10 |
| Polymerized methyl methacrylate (containing 30% of the polymer dissolved in $\beta$-ethoxy ethyl acetate) | 3.3 |
| Diacetone alcohol | 85.1 |
| Di-(methoxy methyl) dimethylol melamine 60% resin in water) | 1.6 |

This composition was sprayed on a moulded polystyrene plastic product as a finishing lacquer. The coated product was dried at 100° F. for a period of time sufficient to allow solvent evaporation and then heated at about 180° F. for a period of 15 minutes to cure the coating. The coating is resistant to most solvents and possesses high strength, and excellent adhesion. Moreover, the coating does not dissolve the outer surfaces of the polystyrene.

The composition may also be applied to metallic surfaces such as brass, copper, cast metal surfaces or to wood surfaces which have a prime coat thereon and the like in a similar manner to yield a protective or ornamental coating having the above described characteristics. In addition, the coating or film possesses good sanding characteristics and can be sanded, if desired, within 30 to 60 minutes after it is sprayed or brushed.

Instead of polymethyl methacrylate, other film-forming materials such as polymethyl acrylate, polyethyl methacrylate, polyethyl acrylate and the like may be employed.

In place of diacetone alcohol, especially when the composition is to be applied to polystyrene, other solvents such as 2-ethoxyethanol, 2-butoxyethanol, 2-methoxyethanol and the like may be employed. When the above coating composition is applied to metal or wood surfaces, other solvents such as butyl acetate, ethyl acetate, acetone, methyl isobutyl ketone, methyl ethyl ketone and the like may be used to replace the diacetone alcohol.

EXAMPLE III

Coating compositions suitable for application to wood and metal surfaces were prepared as follows:

*Coating composition A*

| | Parts |
|---|---|
| Copolymer Z (as prepared in Example II) | 10 |
| Nitrocellulose (½ second) | 1.2 |
| Di-(methoxy methyl) monomethylol melamine | 1.0 |
| Butyl ricinoleate | 3.3 |
| Ethyl acetate | 16 |
| Toluol | 27 |
| Special denatured alcohol No. 1 | 41.5 |

*Coating composition B*

| | Parts |
|---|---|
| Copolymer Z (as prepared in Example II) | 12 |
| Di-(butoxyethyl) phthalate (plasticizer) | 2 |
| Butyl ricinoleate | 2 |
| Toluol | 48.2 |
| Isopropanol (91% by volume) | 32.2 |
| Di-(methoxy methyl) monomethyl melamine (60% solution in water) | 3.5 |
| Ethyl phosphoric acid | 0.1 |

The above coating compositions were sprayed as top or finishing coatings on cast metal and wood surfaces which had been coated with a primer coat. The articles were heated at 110° F. to dry the coatings and were then heated at 300° F. for a period of about 5 minutes to cure or crosslink the coating. The film deposited thereon was hard, yet flexible, and possessed good resistance to solvents. Moreover, they possessed good sandability within 30 to 60 minutes after application and prior to curing.

The solvents employed in the above coating compositions (A and B) may be replaced by other compatible low boiling or medium boiling solvents such as methanol, ethanol, isopropanol, butanol and other alcohols or with esters such as ethyl acetate, propyl acetate, butyl acetate and the like, or with solvent mixtures as, for example, alcohol-aromatic hydrocarbon mixtures such as denatured alcohol-toluol mixtures, alcohol-petroleum naphtha mixtures such as alcohol-rubber solvent, alcohol-hexane and heptane mixtures, and other mixtures. In alcohol mixtures of the type described the alcohol generally comprises from about 30 to approximately 100% of the total solvent.

Instead of butyl ricinoleate or other plasticizers used in compositions A and B, other compatible plasticizers such as dibutyl phthalate, glyceryl mono-oleate, diglycol monolaurate, triglycol dihexoate, nona-ethylene glycol mono-oleate, tricresyl phosphate, oleic acid, di-(methoxy ethyl) phthalate, methyl phthalyl ethyl glycollate, glyceryl mono-ricinoleate and the like may be employed.

In place of the nitrocellulose in coating composition A, other film-forming materials and especially those which are alcohol-soluble or partially alcohol-soluble may be employed. As examples of these may be mentioned ethyl cellulose, natural resins such as dewaxed dammar, dewaxed shellac, Manila copal and the like.

In all of the foregoing compositions which contain ethyl phosphoric acid as a curing catalyst or accelerator, other acids and particularly organic acids such as tartaric acid, oxalic acid, citric acid and the like may be substituted for the ethyl phosphoric acid, or the acid may be omitted from the coating composition, particularly in those instances where a rapid cure of the coating is not desirable or necessary, since the copolymers employed therein contain sufficient free carboxyl groups and acidity to effect the necessary cure. When such acids are omitted the cure may be effected by heating for longer periods of time or by allowing the coating to cure on prolonged standing at normal room temperatures.

What is claimed is:

1. A coating composition for flexible and nonflexible base materials comprising as essential film-forming materials (1) a copolymer consisting of the copolymerization product of a secondary alkyl half ester of an ethylene α, β dicarboxylic acid selected from the group consisting of maleic and fumaric acids, in which the alkyl group contains from 4 to 12 carbon atoms, and a polymerizable vinyl compound having the structural formula: R—CH=CH₂, where R is a radical selected from the group consisting of phenyl, halogen substituted phenyl and methyl subsbtituted phenyl radicals, said dicarboxylic compound and said vinyl compound being copolymerized in a molal ratio of about 1:1 to 1:2, and (2) an aminoaldehyde thermosetting resin selected from the group consisting of urea-formaldehyde, alkylated urea-formaldehyde, melamine-formaldehyde and alkylated melamine-formaldehyde resins, said copolymer constituting a major proportion and said thermosetting resin constituting a minor proportion of said essential film-forming materials; and a solvent for the foregoing ingredients.

2. A coating composition for flexible and nonflexible base materials comprising as essential film-forming materials (1) a copolymer consisting of the copolymerization product of a secondary alkyl half ester of maleic acid, in which the alkyl group contains from 6 to 10 carbon atoms, and styrene, said half ester and said styrene being copolymerized in a molal ratio of about 1:1 and 1:2, and (2) an amino-aldehyde thermosetting resin selected from the group consisting of ureaformaldehyde, alkylated urea-formaldehyde, melamine-formaldehyde and alkylated melamine-formaldehyde resins, said copolymer constituting a major proportion and said thermosetting resin constituting a minor proportion of said essential film-forming materials; and a solvent for the foregoing ingredients.

3. A coating composition for flexible and nonflexible base materials comprising about 5 to 28% by weight of a copolymer consisting of the copolymerization product of a secondary alkyl half ester of maleic acid, in which the alkyl group contains from 6 to 10 carbon atoms, and styrene, said half ester and styrene being copolymerized in a molal ratio of about 1:1 to 1:2; an amino-aldehyde thermosetting resin selected from the group consisting of urea-formaldehyde, alkylated urea-formaldehyde, melamine-formaldehyde and alkylated melamine-formaldehyde resins, said thermosetting resin being present in amounts varying between 0.2 to 4.0% by weight; and a solvent for the foregoing ingredients.

4. A coating composition for flexible and nonflexible materials comprising about 5 to 28% by weight of a copolymer consisting of the copolymerization product of methyl isobutyl carbinyl acid maleate and styrene, said maleate and styrene being copolymerized in a molal ratio of about 1:1 to 1:2, methylated melamine-formaldehyde resin, said resin being present in quantities varying between about 0.2 to 4.0% by weight, and a solvent for the foregoing ingredients.

5. A coating composition substantially as set forth in claim 4 except that the copolymer is a copolymer of methyl amyl carbinyl acid maleate with styrene.

6. A coating composition substantially as set forth in claim 4 except that the copolymer is a copolymer of methyl hexyl carbinyl acid maleate with styrene.

7. A base material coated on at least one surface thereof with a film comprising as the essential film-forming constitutent the reaction product of (1) a copolymer consisting of the copolymerization product of a secondary alkyl half ester of an ethylene α, β dicarboxylic acid selected from the group consisting of maleic and fumaric acids, in which the alkyl group contains from 4 to 12 carbon atoms, and a polymerizable vinyl compound having the structural formula:

R—CH=CH₂ where R is a radical selected from the group consisting of phenyl, halogen substituted phenyl and methyl substituted phenyl radicals, said dicarboxylic compound and said vinyl compound being copolymerized in a molal ratio of about 1:1 to 1:2, and (2) an amino-aldehyde thermosetting resin selected from the group consisting of urea-formaldehyde, alkylated urea-formaldehyde, melamine-formaldehyde and alkylated melamine-formaldehyde resins, said copolymer constituting a major proportion and said thermosetting resin constituting a minor proportion of said reaction product.

8. A base material coated on at least one surface thereof with a film comprising as the essential film-forming constituent the reaction product of (1) a copolymer consisting of the copolymerization product of a secondary alkyl half ester of maleic acid, in which the alkyl group contains from 6 to 10 carbon atoms, and styrene, said half ester and styrene being copolymerized in a molal ratio of about 1:1 to 1:2, and (2) an amino-aldehyde thermosetting resin selected from the group consisting of urea-formaldehyde, alkylated ureaformaldehyde, melamine-formaldehyde and alkylated melamine-formaldehyde resins, said copolymer constituting a major proportion and said thermosetting resin constituting a minor proportion of said reaction product.

9. A base material coated on at least one surface thereof with a film comprising as the essential film-forming constituent the reaction product of (1) a copolymer consisting of the copolymerization product of methyl isobutyl carbinyl acid maleate and styrene, said maleate and styrene being copolymerized in a molal ratio of about 1:1 to 1:2 and (2) a methylated melamine-formaldehyde thermosetting resin, said copolymer constituting a major proportion and said thermosetting resin constituting a minor proportion of said reaction product.

10. A coated article substantially as set forth in claim 8 except that the copolymer is a copolymer of methyl amyl carbinyl acid maleate with styrene.

11. A coated article substantially as set forth in claim 8 except that the copolymer is a copolymer of methyl hexyl carbinyl acid maleate with styrene.

12. A method of coating which comprises applying to a surface a composition comprising as essential film-forming materials (1) a copolymer consisting of the copolymerization product of a secondary alkyl half ester of an ethylene $\alpha, \beta$ dicarboxylic acid selected from the group consisting of maleic and fumaric acids, in which the alkyl group contains from 4 to 12 carbon atoms, and a polymerizable vinyl compound having the structural formula: $R-CH=CH_2$ where R is a radical selected from the group consisting of phenyl, halogen substituted phenyl and methyl substituted phenyl radicals, said dicarboxylic compound and said vinyl compound being copolymerized in a molal ratio of about 1:1 to 1:2, and (2) an amino-aldehyde thermosetting resin selected from the group consisting of urea-formaldehyde, alkylated urea-formaldehyde, melamine-formaldehyde and alkylated melamine-formaldehyde resins, said copolymer constituting a major proportion and said thermosetting resin constituting a minor proportion of said essential film-forming materials, and a solvent for the foregoing ingredients; and then drying and curing the composition.

GERALD R. BARRETT.

REFERENCES CITED

The following references are of record in the file of this patent:

UNITED STATES PATENTS

| Number | Name | Date |
|---|---|---|
| 2,047,398 | Voss et al. | July 14, 1936 |
| 2,279,881 | D'Alelio | Apr. 14, 1942 |
| 2,411,590 | Powell | Nov. 26, 1946 |
| 2,426,902 | Seymour | Sept. 2, 1947 |

FOREIGN PATENTS

| Number | Country | Date |
|---|---|---|
| 466,898 | Great Britain | June 8, 1937 |
| 579,254 | Germany | June 22, 1933 |